US011161480B2

(12) United States Patent
Rathousky

(10) Patent No.: US 11,161,480 B2
(45) Date of Patent: Nov. 2, 2021

(54) TIRE WASHING FACILITY WITH WASHING WATER PIPES

(71) Applicant: FRUTIGER COMPANY AG, Winterthur (CH)

(72) Inventor: Lubomir Rathousky, Winterthur (CH)

(73) Assignee: FRUTIGER COMPANY AG, Winterthur (CH)

(*) Notice: Subject to any disclaimer, the term of this patent is extended or adjusted under 35 U.S.C. 154(b) by 462 days.

(21) Appl. No.: 16/071,503

(22) PCT Filed: Jan. 21, 2016

(86) PCT No.: PCT/EP2016/051256
§ 371 (c)(1),
(2) Date: Jul. 20, 2018

(87) PCT Pub. No.: WO2017/125157
PCT Pub. Date: Jul. 27, 2017

(65) Prior Publication Data
US 2020/0346626 A1    Nov. 5, 2020

(51) Int. Cl.
*B60S 3/04* (2006.01)
(52) U.S. Cl.
CPC ..................... *B60S 3/042* (2013.01)
(58) Field of Classification Search
None
See application file for complete search history.

(56) References Cited

U.S. PATENT DOCUMENTS

| 4,971,084 A | 11/1990 | Smith et al. |
| 2008/0000508 A1* | 1/2008 | Lee .................. B60S 3/042 |
| | | 134/123 |
| 2014/0102489 A1 | 4/2014 | Smith |

FOREIGN PATENT DOCUMENTS

| DE | 38 02 409 A1 | 8/1989 |
| DE | 3802409 A1 * | 8/1989 |

(Continued)

OTHER PUBLICATIONS

English machine translation of FR2839032.*
(Continued)

*Primary Examiner* — David G Cormier
*Assistant Examiner* — Thomas Bucci
(74) *Attorney, Agent, or Firm* — Rothwell, Figg, Ernst & Manbeck, P.C.

(57) ABSTRACT

A tire or caterpillar track washing facility system having a grid structure which is drivable upon by the vehicle to be washed and which defines a plane. The system includes a pair of longitudinal support structures which extends parallel to the plane and defines a central axis. A plurality of washing water pipes with nozzles supported on the longitudinal support structures extend parallel to the plane and transversely to a y-direction of the central axis. The y-direction of the central axis, an x-direction perpendicular to the central axis and parallel to the plane, and a z-direction of the surface normal to the plane define a Cartesian coordinate system. Nozzle axes are perpendicular to a pipe direction of the washing water pipes and inclined to the z-direction. The pipe direction of at least a part of the washing water pipes has a directional component in the y-direction.

11 Claims, 4 Drawing Sheets

(56) References Cited

FOREIGN PATENT DOCUMENTS

DE  20 2008 001 109 U1   4/2008
FR            2839032  *  4/2002

OTHER PUBLICATIONS

English machine translation of FR2839032 (Year: 1989).*
International Search Report and Written Opinion dated Oct. 27, 2016 in PCT/EP2016/051256 (10 pages).

* cited by examiner

Fig. 5.b) (Amended)

PRIOR ART

TIRE WASHING FACILITY WITH WASHING WATER PIPES

CROSS REFERENCE TO RELATED APPLICATION

This application is a 35 U.S.C. 371 National Phase Entry Application from PCT/EP2016/051256, filed Jan. 21, 2016, the disclosure of which is incorporated herein in its entirety by reference, and priority is claimed to the foregoing.

The present invention relates to a tire or caterpillar track washing facility.

There are numerous situations, for example in the field of construction sites, quarries, mines and landfills, where it is necessary to wash the tires of a vehicle before it leaves the place of work and drives on the public roads. The matter relates to keeping the streets clean and safe for traffic. Another application is the cleaning of vehicles before they drive on the runways of an airfield. For this purpose, tire washing facilities of the type mentioned are used.

Tire washing facilities of this type are known and are sold by the applicant.

Previously known tire washing facilities have a bridge-like grid structure, which defines a level passable by the vehicle to be washed. In the area of this grid structure, the cleaning takes place. During the cleaning process, water is sprayed from the nozzles onto the tires and the lower chassis area. The polluted water drips down through the grid structure where it can be collected by a dirty water tank. The grid structure comprises a pair of longitudinal support structures, which extend parallel to the plane and define a central axis, and a plurality of washing water pipes with nozzles extending transversely to the direction of the central axis and supporting the longitudinal support structures. The direction (y-direction) of the central axis, the direction (x-direction) perpendicular to the central axis and parallel to the plane, and the direction of the surface normal (z-direction) to the plane define a Cartesian coordinate system. The direction of the central axis lies in the direction of travel of the vehicle to be washed. The nozzles on the washing water pipes are mounted so that their nozzle axes are perpendicular to the pipe direction of the washing water pipes and inclined to the surface normal to the plane.

The washing water pipes with nozzles are connected to a water supply system. A prior-known tire washing facility has near-bottom nozzles for generating water jets which hit the vehicle to be cleaned in the area of the tires and the lower chassis. Such a tire washing facility can carry vehicles, optionally trucks with cargo.

It is the object of the present invention to provide an improved tire or caterpillar track washing facility.

This is achieved in that for at least a portion of the washing water pipes, the pipe direction has a vector component in the y-direction.

The cleaning with such a tire washing facility is particularly effective. Namely, with the above-described washing water pipes, which are not quite perpendicular to the central axis, the direction of the jets of water acquires a sideways component with respect to the passage direction of the vehicle to be washed. A jet of water from a nozzle, which comes to lie in the passage of the vehicle next to the vehicle, can hit the vehicle laterally in the tire and lower chassis area. The inventors have realized that, surprisingly, the overall effect of the facility is thus improved.

The sideways component of the water jet may be given a direction to the tires of the vehicle to be washed in accordance with the position of the nozzle with respect to the transverse direction to the vehicle by selecting the direction of inclination of the nozzle axis with respect to the direction of the surface normal and the selection of the pipe direction of the washing water pipe. Thus, both the outside of the tire, as well as the vehicle-facing side of the tires are hit by water jets.

Since tire washing facilities have the purpose of preventing the pollution of the public road and less of a clean vehicle, the washing power should concentrate on the wheels and the lower chassis. All water jets that act further up contribute nothing to the actual goal achievement. If the facility sprays high up, the normally clean upper body is also wetted with partially polluted water and thus will become dirtier than before the washing process. The spraying of rear-view mirrors or vehicle windows of partially contaminated water should be avoided, as this may necessitate a separate post-cleaning before driving on. Overall, a low spray pattern is desired. The tire washing facility according to the invention achieves a low spray pattern.

Further embodiments are disclosed herein.

In one embodiment, washing water pipes are each constructed of a U-profile and an L-profile, which are welded at their longitudinal edges.

Washing water pipes constructed in this manner are particularly robust and viable. In addition, the production of semi-finished products, such as U-profiles and L-profiles, is cost-effective. Prior to making the final pipe shape by welding the two profiles, additional processing steps such as nozzle installation and trimming at oblique angles can be easily accomplished. The washing water pipes have, for example, a pentagonal cross-section, preferably with an L-profile as a ridge and a U-profile as a base. In this variant of the embodiment just described, the ridge is at the top and carries nozzles. The upper side of the washing water pipes comes into contact with the tires of the vehicle to be cleaned. In this arrangement, the tires of the vehicle to be washed are deformed when passing over the edge of the L-profile and open gaps of the tire tread. Due to the nozzles located in the immediate vicinity, cleaning of the tires is particularly effective. In addition, in nozzles which are mounted in those surfaces which form the ridge, a jet axis direction is easily achieved, which is inclined relative to the surface normal to the plane. The grid structure may comprise transverse struts, which have the same cross-section as said washing water pipes, but carry no nozzles and need not be water-bearing.

One embodiment has a plurality of washing water pipes (30) with nozzles, wherein for at least a part of the washing water pipes with nozzles the following applies: the angle between the pipe direction and the direction of the central axis satisfies the conditions:

$$60° \leq \alpha \leq 88°,$$

preferably $$70° \leq \alpha \leq 80°.$$

With a pipe direction in this angular range, on the one hand the intended sideways component of water jets leading to more efficient cleaning is achieved and on the other hand washing water pipes extending in this angular range ensure good grip of the passable grid structure. Profile elements mounted between the washing water pipes without nozzles can complete the grid structure. Such profile elements are preferably aligned parallel to the washing water pipes. The obliquely arranged washing water pipes and profile elements increase the flexing effect in the case of tire vehicles and they are passable by tracked vehicles. Overall, the oblique arrangement also leads to smooth running and improved stability.

In another embodiment, washing water pipes with nozzles are mounted on both sides of the central axis in an arrow-shaped arrangement.

This embodiment reduces the risk of lateral slippage of tires on the grid structure and the grip, smooth running and stability are additionally increased.

In a further embodiment, at least one nozzle is integrated in a nozzle module, which is detachably connected to a washing water pipe.

Thus, the nozzles are interchangeable with the nozzle module and can also be cleaned separately from the tire washing facility. A nozzle module can be easily constructed in the form of a plate. Through-holes for screws may allow a detachable connection to the washing water distribution system, in particular directly to a washing water pipe in the grid structure. Nozzles can be realized as through-holes through the nozzle module.

In one embodiment
nozzles are attached in the region of the grid structure, wherein a first group of nozzles comprising at least one nozzle is fed by a first washing water supply system,
a first pump for supplying washing water is connected to the first washing water supply system,
a second group of nozzles comprising at least one nozzle is mounted in the region of the grid structure and fed by a second washing water supply system, and
a second pump for supplying washing water to the second washing water supply system is connected.

In this way, two groups of nozzles can be operated simultaneously, which make different demands on the pumps in terms of pressure and flow rate. For example, the first group of nozzles may thus comprise a number of spatially distributed nozzles with a small nozzle cross-section and the second group may comprise nozzles with a large nozzle cross-section, which apply large quantities of washing water to typically heavily soiled areas. In this case, the second pump may be specifically designed for high flow rate. This amazingly improves the overall effect of the system. Overall, a better cleaning result is achieved with such a tire washing facility.

In a further embodiment, at least one nozzle of the second group of nozzles has a nozzle cross-sectional area which is at least ten times larger, preferably at least one hundred times larger, than the largest nozzle cross-sectional area of a nozzle from the first group of nozzles.

With such a large nozzle, intensive cleaning of heavily soiled areas on the lower chassis area can be performed. In this embodiment, for example, a nozzle in the second group of nozzles may have a nozzle cross-section of more than 10 $cm^2$, while the nozzles in the first group of nozzles have nozzle cross-sections of up to a maximum of 10 $mm^2$. Since the second group of nozzles is supplied by a separate pump, particularly high flow rates can be achieved by these nozzles. For example, the second group of nozzles may consist of a pair of such large nozzles, wherein a washing water flow rate of 900 l/min can be achieved for each nozzle.

In a further embodiment, the jet direction of at least one nozzle of the second group of nozzles is aligned perpendicular to the grid structure.

In this embodiment, heavily soiled areas on the underside of the vehicle are typically optimally cleaned. For example, intensive washing of the fender with the nozzle arrangement according to this embodiment is possible.

In another embodiment, at least one washing water pipe with nozzles is connected to the first washing water distribution system.

In another embodiment, further nozzles are mounted spaced from the grid structure.

Further nozzles can be mounted, for example, above the grid structure laterally to the passage area. The further nozzles can be connected, for example, to the first or second washing water distribution system. A supply of the other nozzles by further washing water distribution systems, and further pumps connected thereto, is also conceivable.

A further embodiment has at least one nozzle module comprising at least one of the further nozzles, wherein the nozzle module is detachably connected to one of the washing water supply systems.

Since the nozzle module is detachably connected to one of the washing water supply systems, it can be easily replaced. Depending on the degree of soiling and the vehicle type to be cleaned, a nozzle module adapted to the situation can be used. Such a nozzle module can be designed, for example, as a horizontally or vertically aligned nozzle beam. Also, for cleaning dirty nozzles, it is particularly advantageous if the cleaning does not have to be done directly on the tire washing facility. A further advantage results from the fact that a nozzle module, which is small compared to a washing water pipe or the grid structure, is easy to handle. This fact allows particularly economical manufacturing processes for the nozzle module.

All mentioned embodiments can be combined with one another as far as they are not in conflict with each other and as far as the combination is technically feasible.

Furthermore, the tire washing facility according to the invention can be combined with known elements of generic tire washing facilities. Thus, a dirty water collection tank can be installed below the grid structure. The dirty water can be treated in a treatment plant and reused. Pumps and a distribution system for the washing water can supply washing water to the washing water pipes with nozzles in the grid structure as well as other nozzles with. Walls attached to the side of the tire washing facility can prevent the splash-off of dirty water and serve as a support for other nozzles. In addition to the washing water pipes, further transverse, load-bearing elements may be part of the grid structure. As a cleaning liquid, water with the addition of soap or disinfectants can be considered apart from pure water depending on the application. Designs of tire washing facilities that facilitate the transport to another location are known and can also be applied to the tire washing facility according to the invention. The tire washing facility according to the invention can be supplemented with up and down ramps. Alternatively, a floor-level installation is possible.

Steel beams can be used as longitudinal support structures extending along the tire washing facility. The longitudinal support structures may be water-bearing and form part of a washing water distribution system. The longitudinal support structures can also have reinforced edges of a dirty water collecting tank or a sewer. For permanently installed tire washing facilities, concrete longitudinal support structures are also suitable.

Even if the device according to the invention is called a tire washing plant, its use due to the robust construction is also suitable for the cleaning of crawler vehicles, for example construction machines or armored vehicles.

Embodiments of the present invention will be explained in more detail below with reference to the drawings, wherein:

FIG. 1 shows a tire or caterpillar track washing facility in a schematic, perspective and simplified view;

FIGS. 2a, 2b, and 2c show a passage area of a tire or caterpillar track washing facility according to the invention in plane view (FIG. 2a), side view (FIG. 2b) and front view (FIG. 2c);

FIG. 4 shows an enlarged detail from the plan view in FIG. 2a;

Figure 1:
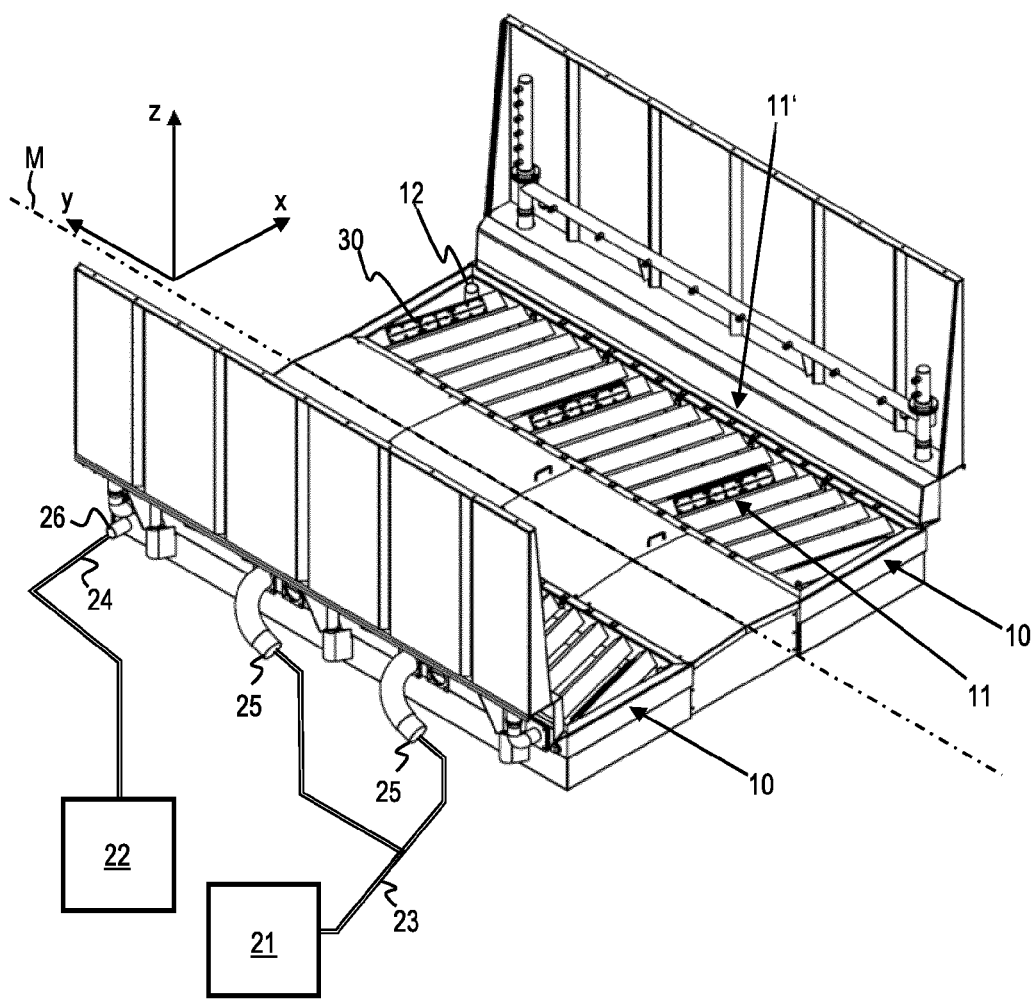

FIG. 1 shows a tire or caterpillar track washing facility according to the invention. The region with the grid structure 1 to be passed through by the vehicle to be washed is shown in perspective view. Schematically, the two pumps 21 and 22 and their connection 23, 24 to the washing water inlets 25, 26 of the first and second washing water distribution system are shown. A drivable grid structure 10 has the form of two tracks. Between obliquely arranged transverse rungs of the grid structure, washing water pipes 30 are arranged with nozzles 11. The washing water pipes with nozzles are similar in shape to the rungs of the grid structure and also assume a supporting function. Furthermore, nozzles 11' are arranged on the edge of the grid structure. The nozzles 11, 11' are fed by a first washing water distribution system whose inlets 25 are connected to the first pump 21. Most lines of the first and second washing water distribution systems are not visible in this illustration. These lines run partly below the grid structure. Through gaps between the rungs and the carrying washing water pipes 30 with nozzles, dirty water can drip down, where it is collected by a dirty water tank. Another nozzle 12 is mounted in the region of the grid structure. This nozzle 12 has a large nozzle cross-section and its jet direction is upwards perpendicular to the grid structure. The nozzle 12 is fed by a second washing water distribution system whose inlet 26 is connected to the second pump 22. The nozzle 12 is designed for high flow rates and is used for intensive cleaning of the chassis. A central axis M of the grid structure and a Cartesian coordinate system with an x-axis x (transverse direction), a y-axis y (passage direction of the vehicle to be washed) and a z-direction z (vertical) are shown for orientation.

Figure 4:
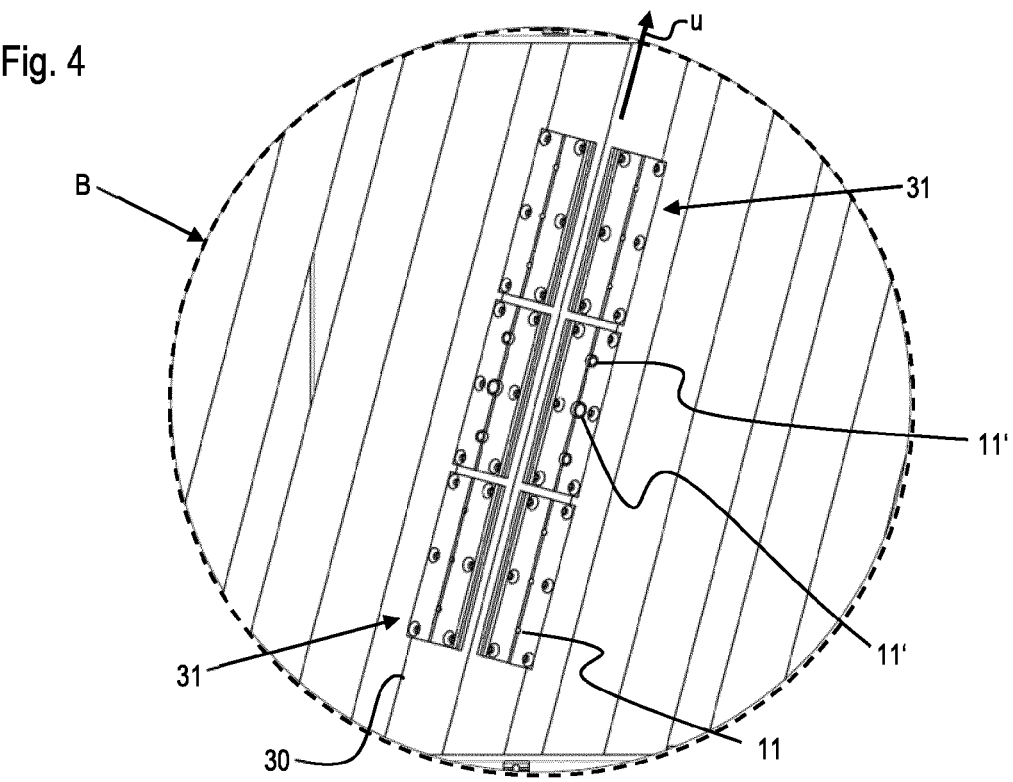

FIG. 2.a) shows a tire or caterpillar track washing facility according to the invention in a plan view. The tire washing facility is composed in this case of two modules of the type shown in FIG. 1, so that a driving distance is obtained which is twice as long. The length of a single washing module can be, for example, 3.6 m. The travel distance of the tire washing facility composed of two modules is then 7.2 m. The modules each have inlets 25 for the first washing water distribution system and an inlet 26 for the second washing water distribution system. The pumps of the tire washing facility are not shown in this illustration. Each module can have its own pumps for the supply of washing water. For the sake of clarity, only a part of the nozzles 11 of the first group, the nozzles 12 of the second group and the washing water pipes 30 with nozzles are provided with reference numerals. Supporting washing water pipes 30 with nozzles are arranged on both sides of the central axis of the grid structure 10 in an arrow-shaped or chevron-shaped manner. The region bordered by a dashed line and designated by the reference numeral B in which such a washing water pipe is located is shown in FIG. 4 in an enlarged manner. By way of example, the pipe direction u is shown as an arrow for one of the washing water pipes 30. FIG. 2.b) shows the same tire washing facility in a side view, FIG. 2.c) shows the same tire washing facility in a front view, i.e. viewed in the passage direction (y-direction) of the vehicles to be washed. In the front view, walls are visible left and right, which prevent a lateral splashing away of dirty water. Dirty water tanks are present beneath the grid structure. Further nozzles 13, which are spaced from the grid structure 10, are mounted in the region of the side walls.

Figure 2A:
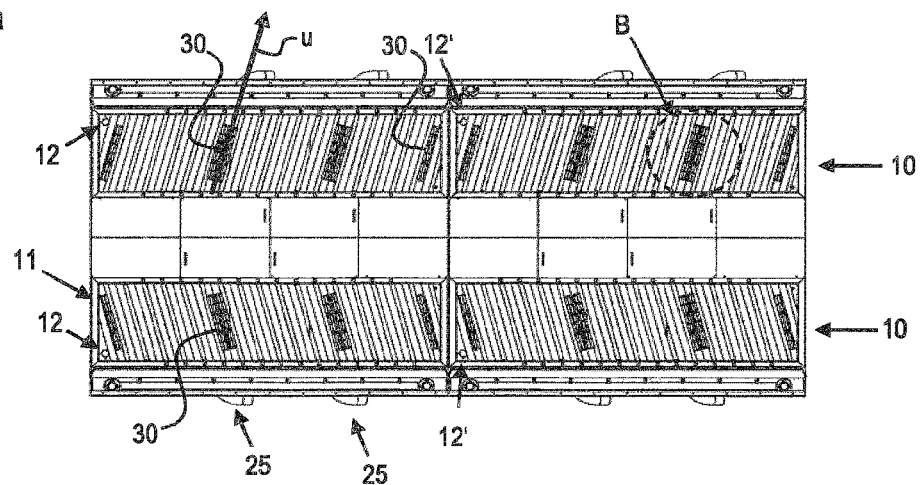
Figure 2B:
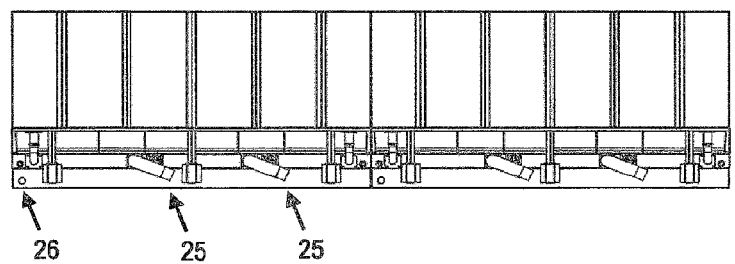
Figure 2C:
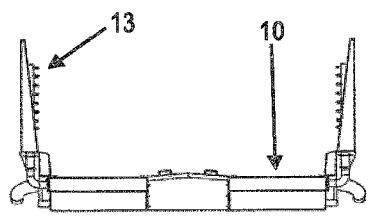
Figure 3:
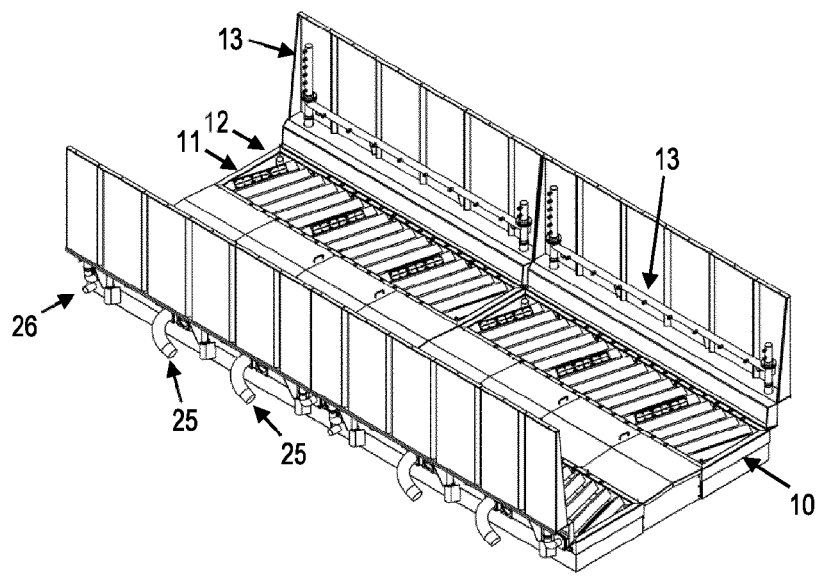
FIG. 3 shows a perspective view of the passage area of the tire and caterpillar track washing facility of FIGS. 2a, 2b, and 2c.

FIG. 3 shows the tire washing facility from FIGS. 2a-2c in a perspective view. Two units of the type shown in FIG. 1 are assembled here into a tire washing facility with longer drive-through passages.

FIG. 4 shows an enlarged section of the area B bordered by a dashed line from the plan view of the grid structure according to FIG. 2a. One of the washing water pipes carries six nozzle modules, which are releasably attached to the washing water pipe with screws. Each of the nozzle modules has three nozzles. The nozzle cross-sections of the centrally arranged nozzle modules are designed to be larger than the nozzle cross-section of the nozzle modules arranged on the edge. The nozzle modules are mounted on inclined surfaces of the washing water pipes, so that the nozzles of three of the nozzle modules that are visible here have a jet axis with a direction component in the direction of travel of the vehicle to be washed, while the other three nozzle modules produce water jets with a directional component opposite the direction of travel. The pipe direction u of the washing water pipe 30 is shown as an arrow.

Figure 5:
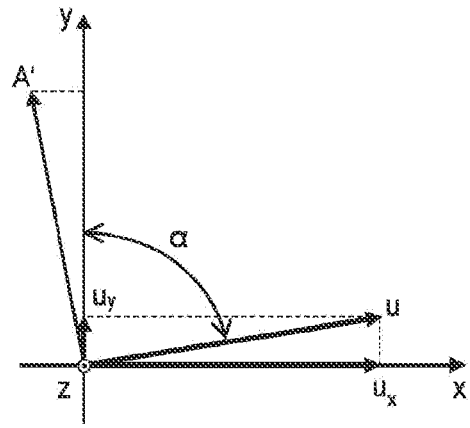
FIGS. 5a and 5b show the directional components of the pipe direction (u) of washing water pipes in a Cartesian coordinate system (x, y, z) defined according to FIG. 1.

FIGS. 5a and 5b show the pipe direction u of washing water pipes in the previously described Cartesian coordinate system with axes x, y and z. The axes x and y are in the representation plane of the figure, while the z-axis is perpendicular to the representation plane. The representation plane of the figure corresponds to the plane E1. The projection A' of a nozzle axis A, which is perpendicular to the pipe direction u and inclined to the z-direction, is also shown. FIG. 5a shows the situation for the pipe direction u of a washing water pipe 30 in a tire washing facility according to the invention. The vector components $u_x$ and $u_y$ of the direction u are plotted in the direction of the x and y axes. The non-zero vector component $u_y$ is characteristic for this embodiment. The nozzle axis A, and thus also the projection A' of the nozzle axis A drawn into the xy plane in FIG. 5a, thereby obtains a component in the x-direction. The angle α between u and y differs here from the right angle. FIG. 5b shows the situation for the pipe direction u of a washing water pipe 3 from a tire washing facility according to the prior art. The direction u lies in the direction of the x-axis and has no vector component in the y-direction. Consequently, also the nozzle axis A and its projection A' have no x component. The angle α between u and y is a right angle in this case.

Figure 6:
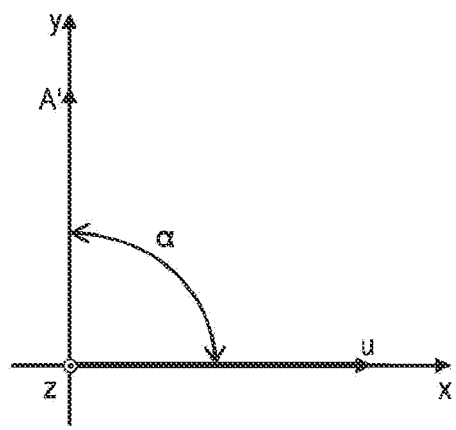
FIGS. 6a and 6b show the grid structure of an embodiment of the tire washing facility according to the invention in a side view (FIG. 6a) and a front view (FIG. 6b).
Figure 6:
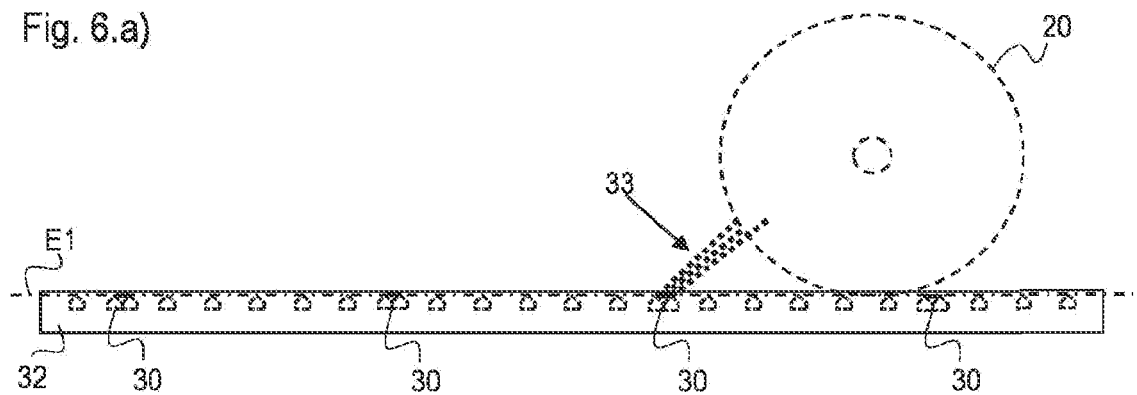
Figure 6:
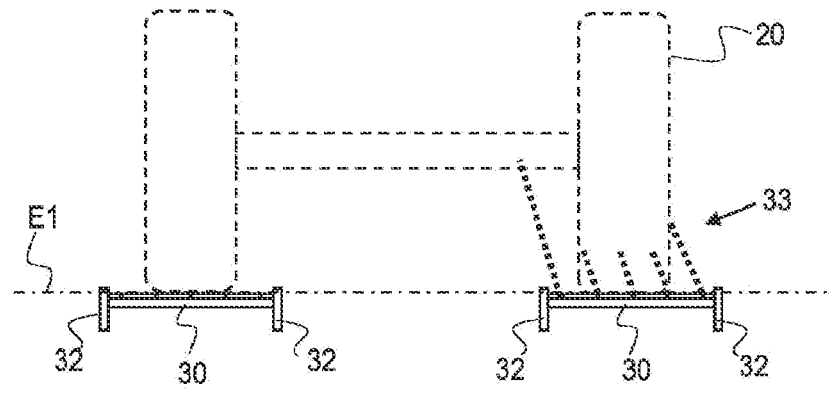

FIGS. 6a and 6b show a grid structure of the tire washing facility according to the invention in a side view (FIG. 6a) and in a front view (FIG. 6b). The pipe direction of the washing water pipes corresponds to the situation shown in FIG. 5a, i.e., the pipe direction u of the washing water pipes 30 forms with the direction y the angle α not visible in this representation. FIGS. 6a and 6b illustrate the effect of the pipe direction according to FIG. 5a. Wheels 20 of an axle of the vehicle to be washed are shown with the dashed line. The position of the wheels 20 is a position selected by way of example, as occurs in the course of a cleaning process.

Nozzles are shown as dots on the washing water pipes 30. For a number of nozzles on a washing water pipe 30, water jets 33 are shown, which hit wheels and axle 20 in this position. The direction y lies in the roll-off direction of the tires of the vehicle to be washed. Washing water pipes 30 with nozzles are supported on longitudinal support structures 32, extend parallel to the plane E1 and transversely to the direction y. The pipe direction u of the washing water pipes 30 has a vector component $u_y$ in the y direction. It is clear from the water jets 33 running obliquely in FIG. 6a that the nozzle axis A is inclined to the surface normal z. A and z are not shown here for reasons of clarity, but their direction is to be deduced by the position of the water jets and the plane E1.

LIST OF REFERENCE NUMERALS

10 Grid structure
11, 11' Nozzle (from the first group of nozzles)
12, 12' Nozzle (from the second group of nozzles)
13 Nozzle (spaced from the grid structure)
21 First pump
22 Second pump
23 Connection of the first pump to the first washing water distribution system
24 Connection of the second pump to the second washing water distribution system
25 Inlet of the first washing water distribution system
26 Inlet of the second washing water distribution system
30 Supporting washing water pipe
31 Nozzle module
32 Longitudinal support structures
33 Water jet
α Angle between u and y
A Nozzle axis
A' Projection of the direction of the nozzle axis into the plane E1
B Region from FIG. 2a
E1 Driveable plane
M Central axis
u Pipe direction
$u_x$, $u_y$ Directional components of the pipe direction u in the x- and y-direction
x Direction perpendicular to the central axis and parallel to E1

The invention claimed is:

1. A tire or caterpillar track washing facility, having a load bearing grid structure in a plane and which is drivable upon by the vehicle to be washed, comprising:
a pair of longitudinal support structures which extends parallel to the plane in a y-direction; and
a plurality of supporting washing water pipes with nozzles of a first group of nozzles, the plurality of supporting washing water pipes being supported on the longitudinal support structures and extending parallel to the plane and transversely to the y-direction;
wherein the load bearing grid structure is formed of and by the pair of longitudinal support structures and the plurality of supporting washing water pipes with nozzles;
wherein the y-direction, an x-direction perpendicular to the y-direction and parallel to the plane, and a z-direction of the surface normal to the plane define a Cartesian coordinate system, and wherein nozzle axes are perpendicular to a pipe direction of the supporting washing water pipes and are inclined to the z-direction;
wherein the pipe direction of at least a part of the supporting washing water pipes has a directional component in the y-direction,
wherein the nozzles are mounted in a region of the load bearing grid structure wherein said first group of nozzles comprise at least one nozzle is supplied by a first washing water supply system,
a first pump for supplying washing water is connected to the first washing water supply system,
a second group of nozzles comprising at least one further nozzle is mounted in the region of the load bearing grid structure and supplied by a second washing water supply system,
a second pump for supplying washing water is connected to the second washing water supply system, and
wherein a jet direction of the at least one further nozzle of the second group of nozzles is aligned perpendicular to the load bearing grid structure.

2. The tire or caterpillar track washing facility according to claim 1, wherein the washing water pipes with nozzles each have a U-profile and an L-profile, which are welded at their longitudinal edges.

3. The tire or caterpillar track washing facility according to claim 1, wherein for at least a portion of the supporting washing water pipes with nozzles, an angle α between the pipe direction and the y-direction satisfies the following:

$$60° \leq \alpha \leq 88°.$$

4. The tire or caterpillar track washing facility according to claim 3, wherein $$70° \leq \alpha \leq 80°.$$

5. The tire or caterpillar track washing facility according to claim 1, wherein the supporting washing water pipes with nozzles are mounted on both sides of a central axis in a chevron-shaped arrangement which is supported by two pairs of longitudinal support structures.

6. The tire or caterpillar track washing facility according to claim 1, wherein the at least one nozzle of the first group of nozzles is integrated in a nozzle module, which is releasably connected to one of the supporting washing water pipes.

7. The tire or caterpillar track washing facility according to claim 1, wherein at least one nozzle of the second group of nozzles has a nozzle cross-sectional area which is at least ten times larger than the largest nozzle cross-sectional area of a nozzle from the first group of nozzles.

8. The tire or caterpillar track washing facility according to claim 7, wherein the at least one nozzle of the second group has a nozzle cross-sectional area which is at least one hundred times larger than the largest nozzle cross-sectional area of the nozzle from the first group.

9. The tire or caterpillar track washing facility according to claim 1, wherein at least one supporting washing water pipe of the plurality of supporting washing water pipes with nozzles is connected to the first washing water distribution system.

10. The tire or caterpillar track washing facility according to claim 1, further including outside of the grid nozzles mounted spaced from the load bearing grid structure.

11. The tire or caterpillar track washing facility according to claim 10, comprising at least one nozzle module having at least one of the outside of the grid nozzles, wherein the nozzle module is detachably connected to one of the first and second washing water supply systems.

* * * * *